April 11, 1944.  A. G. ROSE  2,346,610
CONVEYER MECHANISM
Filed Oct. 10, 1940  3 Sheets-Sheet 1
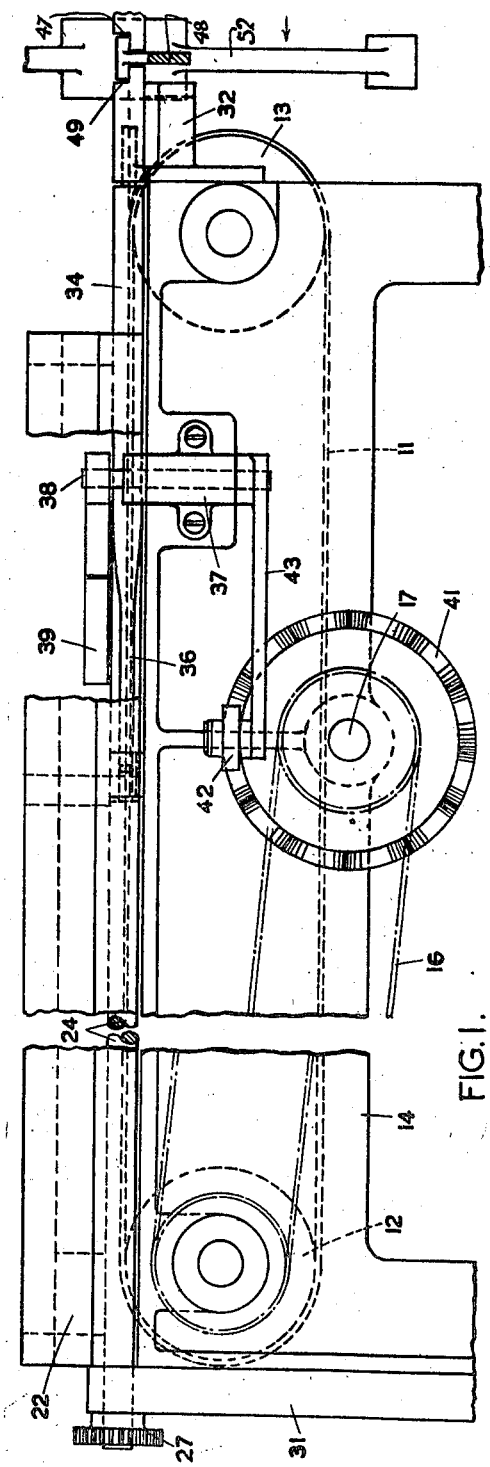
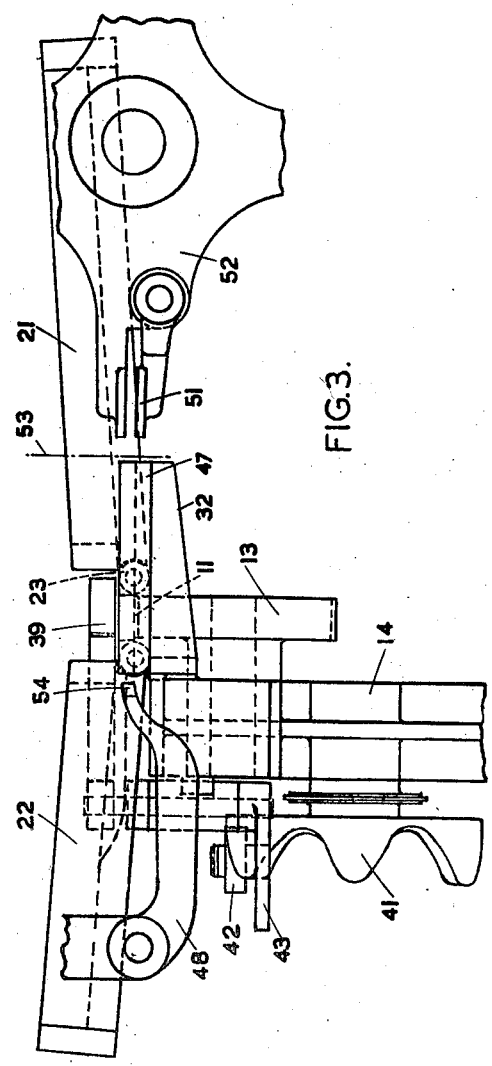
INVENTOR:
A.G. ROSE
BY
Murry, Anderson Liddy
ATTORNEYS.

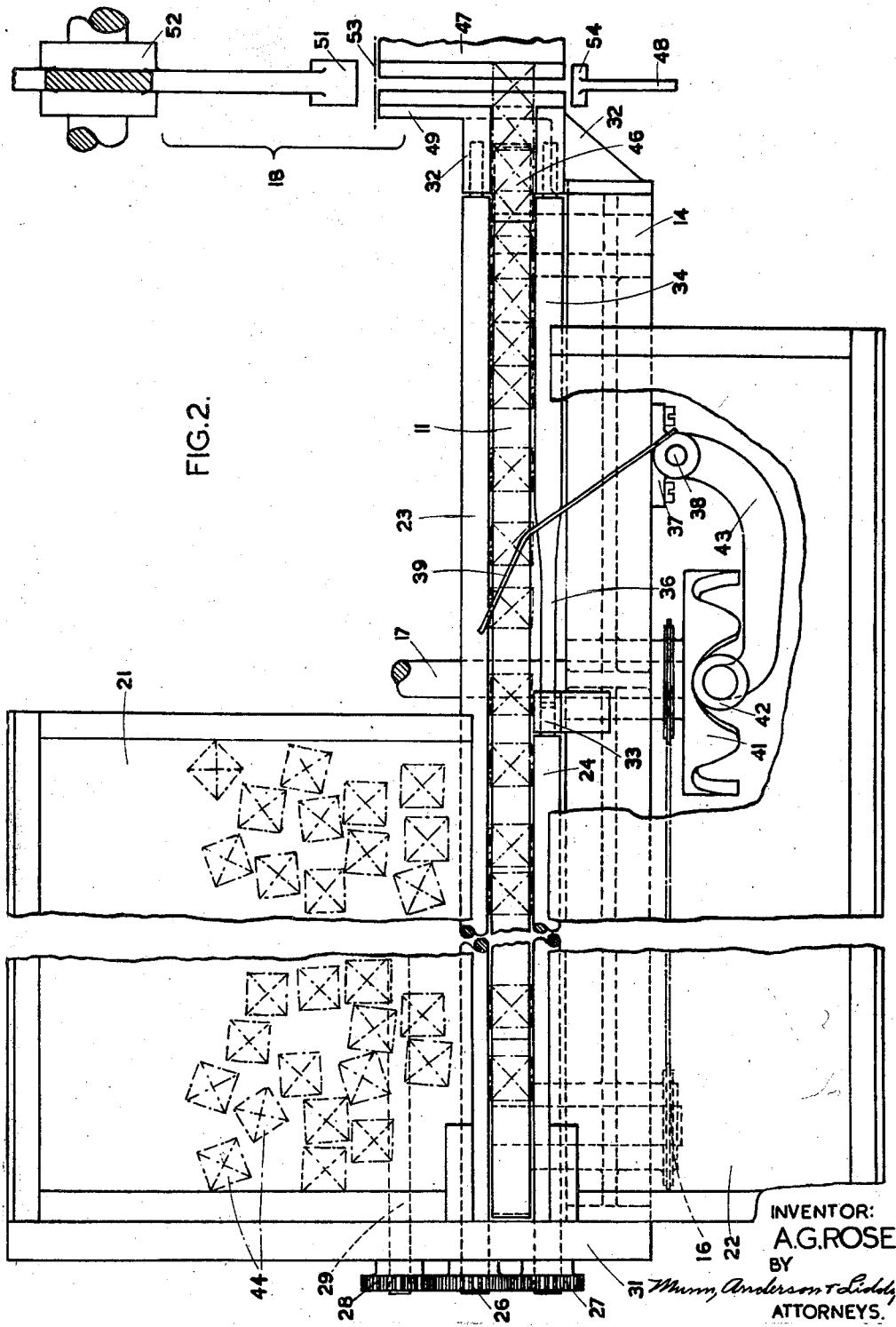

April 11, 1944.   A. G. ROSE   2,346,610
CONVEYER MECHANISM
Filed Oct. 10, 1940   3 Sheets-Sheet 3
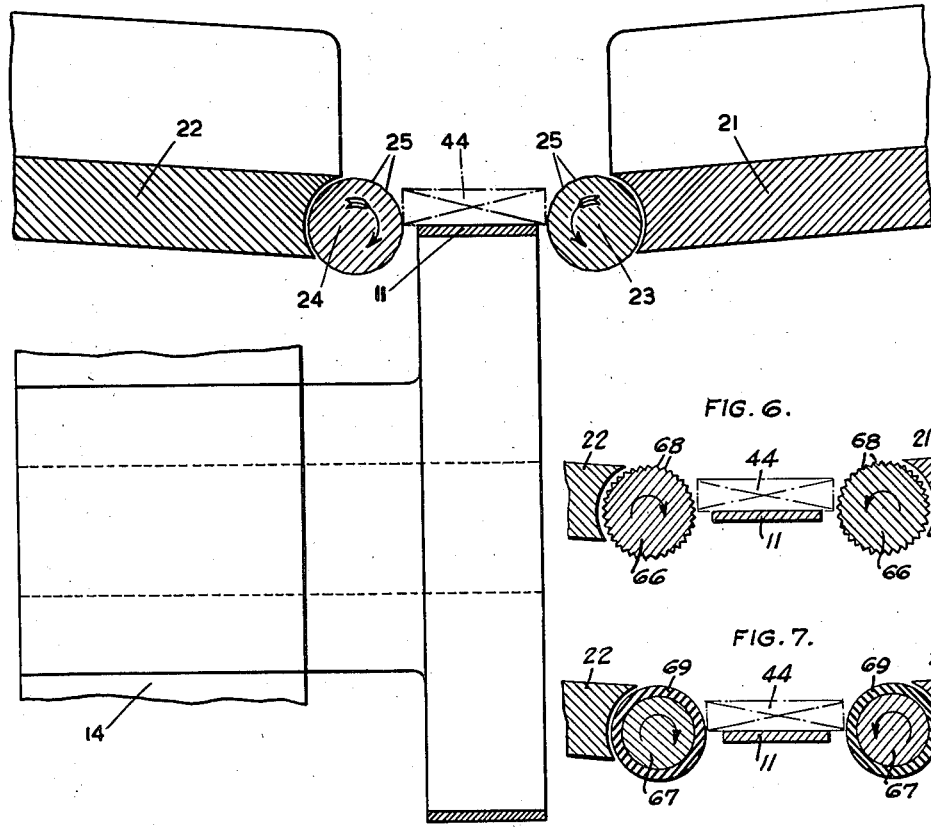
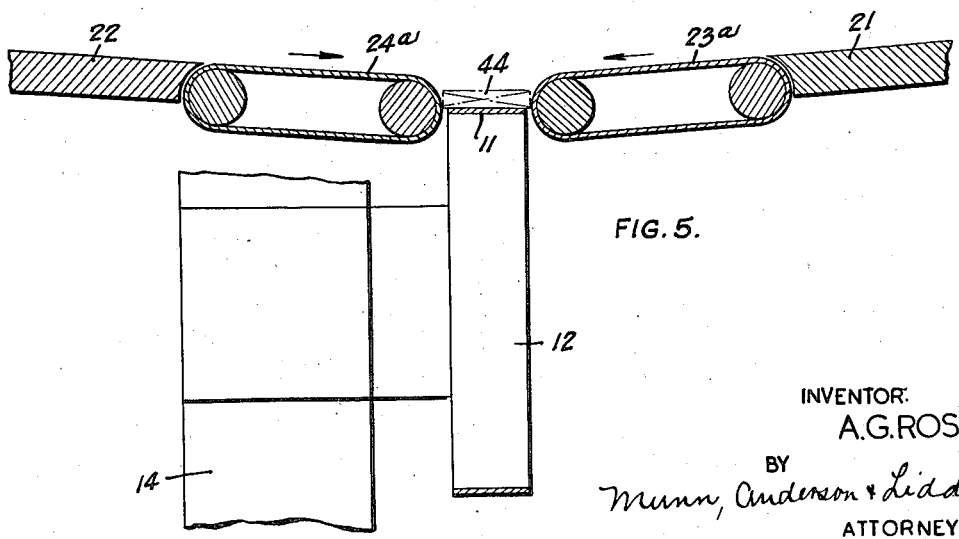
INVENTOR:
A. G. ROSE
BY
Munn, Anderson & Liddy
ATTORNEYS.

Patented Apr. 11, 1944

2,346,610

UNITED STATES PATENT OFFICE 2,346,610

CONVEYER MECHANISM

Alfred German Rose, Gainsborough, England, assignor to Rose Brothers (Gainsborough) Limited, Gainsborough, England, a British company Application October 10, 1940, Serial No. 360,605
In Great Britain October 16, 1939

12 Claims. (Cl. 198—30)

The invention relates to a conveyer mechanism for feeding a succession of sweets, tablets, or other articles to a machine for operating on the articles, e. g. a wrapping machine.

The invention is more particularly concerned with the type of apparatus in which the articles to be fed to the machine are normally transferred by hand from a feed table to a conveyer belt, chain or the equivalent (hereinafter referred to as a conveyer belt) arranged adjacent the feed table.

It is an object of the present invention to provide, in an apparatus of this type, means for facilitating the transfer of the articles from the feed table to the conveyer belt.

According to the invention, therefore, a conveyer mechanism for feeding a succession of sweets, tablets, or other articles to a machine for operating on the articles, comprises a conveyer belt arranged to convey the articles to the machine, and a feed table arranged adjacent the conveyer belt and of which at least a part of the surface is arranged for movement towards the conveyer belt in a transverse direction to carry the articles on to the belt.

The feed table may be composed of a belt of substantial width located to one side of the conveyer belt and arranged to move towards the conveyer belt (i. e. in a direction at right-angles to the movement of the conveyer belt) to carry the articles on to it, the upper surface of the belt being disposed at a level slightly higher than that of the conveyer belt; or there may be two such belts one to each side of the conveyer belt.

Means may be provided for returning to the feed table any article that may be on top of another article on the conveyer belt. Thus, there may be provided a rejecting member in the form of an arm arranged to oscillate about an axis normal to the conveyer belt with its lower edge swinging just clear of the upper surface of the layer of articles on the conveyer belt so as to return surplus articles to the feed table. With such an arrangement, the belts may, if desired, be divided in their width into portions arranged to move towards the conveyer belt and portions arranged to move away from it to carry the surplus articles away.

In the preferred form of the invention the main portion of the feed table is stationary and at its edge immediately adjacent the conveyer belt there is a roller extending alongside the conveyer belt and arranged for rotation in a direction such that its upper surface moves towards the conveyer belt. The top of the roller is preferably slightly above the conveyer belt and there may be two such rollers one to each side of the conveyer belt. The stationary portion of the feed table is conveniently at a level corresponding to that of the top of the roller or rollers.

In order to assist the feeding action of the rollers, they may be formed with a roughened surface, e. g., by the provision of a series of longitudinal flats, serrations, grooves, or a rubber covering.

By way of example, the invention will now be described in greater detail with reference to the accompanying diagrammatic drawings, in which:

Figure 1 is an elevation of a conveyer mechanism according to the invention applied to the feeding of tablets to a wrapping machine, Figure 2 is a plan view of the apparatus shown in Figure 1, Figure 3 is an end view of the apparatus shown in Figure 1 looking in the direction of the arrow shown in Figure 1, Figure 4 is a part sectional end view, similar to Figure 3, showing a portion of the apparatus shown in Figure 3 drawn to an enlarged scale, Figure 5 is a view similar to Figure 4 showing a modified form of apparatus, and Figures 6 and 7 show further examples of feed rollers with roughened surfaces.

Referring to the drawings, a conveyer belt 11 of rectangular cross-section is supported on pulleys 12 and 13 mounted for rotation in the framework 14 of the machine and driven through chain and sprocket gearing 16 from a shaft 17 mounted for rotation in the framework 14. The shaft 17 is driven from a convenient part of the wrapping machine part of which is generally indicated by the reference numeral 18. The upper lap of the conveyer belt 11, which is disposed horizontally, forms the conveying surface and is arranged to carry the tablets to the wrapping machine 18.

Arranged adjacent each side of the upper lap of the conveyer belt 11, towards the end of the machine remote from the wrapping machine, is a feed table consisting of two stationary platforms 21 and 22 and two rollers 23 and 24 extending one alongside each side of the conveyer belt 11 between it and the platforms 21 and 22. The rollers are formed with a series of longitudinal flats 25, are arranged with their axes at the level of the top surface of the belt 11, and are of such a diameter as to extend above the belt by an amount slightly less than the height of the tablets to be conveyed. The rollers are spaced apart by an amount slightly greater than the width of the tablets so as to allow the tablets to pass freely between the rollers. The edges of the platforms 21 and 22 meeting the rollers are shaped partially to embrace the rollers so that the upper surface of each platform meets the top of the corresponding roller to form with the roller a substantially continuous surface. The rollers 23 and 24 are geared together by gears 26 and 27 and are driven by a gear 28 attached to the shaft 29 which, in turn, is driven from a convenient part of the wrapping machine. The direction of rotation of the rollers 23 and 24 is such that the upper surface of each roller moves towards the conveyer.

The roller 23 extends the full length of the conveyer and is housed at one end in an end frame 31 of the machine and at the other end in a bracket 32, attached to the framework 14. The roller 24, however, is somewhat shorter than the roller 23, extending along the conveyer belt by an amount equal to the length of the platform 21, and is housed at one end in the end frame 31 and at the other in a bearing 33 atttached to the framework 14. Extending between the bearing 33 and the bracket 32 is a stationary guide 34 of cylindrical cross-section having a reduced portion 36 which facilitates the rejection of surplus tablets from the conveyer in the manner described below.

Mounted on the side of the framework 14 is a bracket 37 carrying a shaft 38 to the upper end of which is attached an arm 39. The arm 39 is caused to oscillate about the axis of the shaft 38 by the action of a rotatable cam 41, attached to the shaft 17, on a roller 42 carried by a lever 43 attached to the lower end of the shaft 38. The lower edge of the arm 39 is arranged at such a height as to swing just clear of the upper surface of the layer of tablets on the conveyer and is disposed so as to swing across the reduced portion 36 of the guide 34. Any tablet, therefore, which may be fed on to the top of a tablet already on the conveyer is rejected by the oscillating arm 39 which returns it to the platform 22 of the feed table.

In use, the operator places a supply of tablets 44 on the feed table and from time to time pushes them laterally towards the conveyer belt 11, the rollers 23 and 24 facilitating the transfer of the tablets 44 from the feed table to the conveyer belt and also serving to guide the tablets along the conveyer. The tablets are conveyed by the belt 11 towards the wrapping machine 18, surplus tablets being rejected by the oscillating arm 39 as described above, and are discharged on to a delivery plate 46 on the bracket 32 along which they are pushed by succeeding tablets until they are arrested by a guide 47 on the wrapping machine 18. At this stage the tablets come under the control of the wrapping machine, a pusher 48 on the wrapping machine being moved forward at intervals to transfer a tablet from the delivery plate 46 along a guide channel, formed by the guide 47 and a further guide 49 on the delivery plate 46, to a pocket 51 of the mould wheel 52 of the wrapping machine. During the latter operation, a wrapper 53 disposed in the path of the tablet is pushed with the tablet in to the pocket 51, this action causing the wrapper to be partially folded about the tablet in a manner well known in the art.

The pusher 48 is provided with a raised head 54 which, during the charging stroke, slides along the guide channel mentioned above, and at the end of the charging stroke, drops below the guide channel and returns at a lower level so as to clear the next succeeding tablet which by this time has moved up to the guide 47. The construction and operation of a pusher of this type is fully described in United States patent specification, No. 1,861,510, dated June 7, 1932, to which reference may be made for further details.

As shown in Figure 5, the apparatus may be slightly modified by the provision of endless belts 61 supported on pairs of rollers 62 and arranged to be driven in the direction of the arrows shown in Figure 5 for the purpose of facilitating the transfer of the tablets 44 from the feed table to the conveyer belt and also serving to guide the tablets along the conveyer in a similar manner to the rollers 23 and 24.

As shown in Figures 6 and 7, the rollers 23 and 24 may be replaced by rollers 66 or 67, the rollers 66 being formed with a series of longitudinal grooves or serrations 68 and the rollers 67 being provided with a rubber covering 69.

I claim:

1. A conveyer mechanism for feeding a succession of sweets, tablets, or other articles to a machine for operating on the articles, comprising a conveyer belt arranged to convey the articles to the machine, and a feed table arranged adjacent the conveyer belt, said feed table consisting of two stationary platforms arranged one on each side of the conveyer belt above the level of the conveyer belt for supporting the articles to be fed to the conveyer belt and a pair of rollers extending one alongside each side of the conveyer belt between it and the corresponding stationary platform and each having a portion of its surface extending from the edge of the corresponding stationary platform to the corresponding edge of the conveyer belt so as to guide the articles during their conveyance by the conveyer belt, each roller being provided with a series of longitudinal flats and being arranged to rotate in a direction such that the said portion of its surface moves towards the conveyer belt to assist the transfer of the articles from the corresponding stationary platform to the conveyer belt.

2. A wrapping machine for wrapping sweets, tablets, or other articles, comprising a conveyer belt arranged to convey the articles towards the wrapping elements, and a feed table arranged adjacent the conveyer belt, said feed table consisting of two stationary platforms arranged one on each side of the conveyer belt above the level of the conveyer belt for supporting the articles to be fed to the conveyer belt and a pair of rollers extending one alongside each side of the conveyer belt between it and the corresponding stationary platform and each having a portion of its surface extending from the edge of the corresponding stationary platform to the corresponding edge of the conveyer belt so as to guide the articles during their conveyance by the conveyer belt, each roller being provided with a series of longitudinal flats and being arranged to rotate in a direction such that the said portion of its surface moves towards the conveyer belt to assist the transfer of the articles from the corresponding stationary platform to the conveyer belt.

3. A conveyer mechanism for feeding a succession of sweets, tablets, or other articles to a machine for operating on the articles, comprising a conveyer belt arranged to convey the articles to the machine, and a feed table arranged in close proximity to the conveyer belt, said feed table consisting of a stationary platform disposed above the level of the conveyer belt for supporting the articles to be fed to the conveyer belt and a roller extending alongside the adjacent edge of the conveyer belt between it and the stationary platform and having a portion of its surface extending from the edge of the stationary platform to a line in close proximity to the adjacent edge of the conveyer belt so as to form with the surface of said platform a substantially continuous surface, said roller being arranged to rotate in a direction such that said portion of its surface moves towards the conveyer belt to assist the transfer of the articles from the stationary platform to the conveyer belt.

4. Apparatus according to claim 3, wherein the feed table comprises two stationary platforms arranged one on each side of the conveyer belt in close proximity thereto, and a pair of rollers disposed one on each side of the conveyer belt between it and the corresponding platform with their surfaces in close proximity to the adjacent edges of the conveyer belt.

5. Apparatus according to claim 3, wherein the surface of the roller is roughened.

6. A conveyer mechanism for feeding a succession of sweets, tablets, or other articles to a machine for operating on the articles, comprising a conveyer belt arranged to convey the articles to the machine, and a feed table arranged adjacent the conveyer belt, said feed table consisting of a stationary platform disposed above the level of the conveyer belt for supporting the articles to be fed to the conveyer belt and a roller extending alongside the conveyer belt between it and the stationary platform and having a portion of its surface extending from the edge of the stationary platform to the edge of the conveyer belt so as to guide the articles during their conveyance by the conveyer belt, said roller being formed with a series of longitudinal flats and arranged to rotate in a direction such that said portion of its surface moves towards the conveyor belt to assist the transfer of the articles from the stationary platform to the conveyor belt.

7. A conveyer mechanism for feeding a succession of sweets, tablets, or other articles to a machine for operating on the articles, comprising a conveyer belt arranged to convey the articles to the machine, a feed table arranged in close proximity to the conveyer belt, said feed table consisting of a stationary platform disposed above the level of the conveyer belt for supporting the articles to be fed to the conveyer belt and a roller extending alongside the adjacent edge of the conveyer belt between it and the stationary platform and having a portion of its surface extending from the edge of the stationary platform to a line in close proximity to the adjacent edge of the conveyer belt so as to form with the surface of said platform a substantially continuous surface, said roller being arranged to rotate in a direction such that said portion of its surface moves towards the conveyer belt to assist the transfer of the articles from the stationary platform to the conveyer belt, and means for returning to the feed table any article that may be on top of another article on the conveyer belt.

8. A conveyer mechanism for feeding a succession of sweets, tablets, or other articles to a machine for operating on the articles, comprising a conveyer belt arranged to convey the articles to the machine, a feed table arranged adjacent the conveyer belt, said feed table consisting of a stationary platform disposed above the level of the conveyer belt for supporting the articles to be fed to the conveyer belt and a roller extending alongside the conveyer belt between it and the stationary platform and having a portion of its surface extending from the edge of the stationary platform to the edge of the conveyer belt so as to guide the articles during their conveyance by the conveyer belt, said roller being arranged to rotate in a direction such that said portion of its surface moves towards the conveyer belt to assist the transfer of the articles from the stationary platform to the conveyer belt, and means for returning to the feed table any article that may be on top of another article on the conveyer belt, said means comprising an arm disposed above the conveyer belt and arranged to oscillate transversely of the conveyer belt about an axis normal to the plane of the conveyer belt.

9. A conveyer mechanism for feeding a succession of sweets, tablets, or other articles to a machine for operating on the articles, comprising a conveyer belt arranged to convey the articles to the machine, a feed table arranged in close proximity to the conveyer belt, said feed table consisting of a stationary platform disposed above the level of the conveyer belt and a roller extending alongside the adjacent edge of the conveyer belt between it and the stationary platform and having a portion of its surface extending from the edge of the stationary platform to a line in close proximity to the adjacent edge of the conveyer belt so as to form with the surface of said platform a substantially continuous surface, said roller being arranged to rotate in a direction such that said portion of its surface moves towards the conveyer belt to assist the transfer of the articles from the stationary platform to the conveyer belt, and means for returning to the feed table any article that may be on top of another article on the conveyer belt, said means comprising an arm disposed above the conveyer belt and arranged to oscillate transversely of the conveyer belt about an axis normal to the plane of the conveyer belt.

10. Apparatus according to claim 9, wherein the feed table comprises two stationary platforms arranged one on each side of the conveyer belt, and a pair of rollers disposed one on each side of the conveyer belt between it and the corresponding platform.

11. A wrapping machine according to claim 2, comprising means for returning to the feed table any article that may be on top of another article on the conveyer belt, said means including an arm disposed above the conveyer belt and arranged to oscillate transversely of the conveyer belt about an axis normal to the plane of the conveyer belt.

12. A conveyer mechanism for feeding a succession of sweets, tablets, or other articles to a machine for operating on the articles, comprising a conveyer belt arranged to convey the articles to the machine, a feed table arranged in close proximity to the conveyer belt, said feed table consisting of a stationary platform disposed above the level of the conveyer belt for supporting the articles to be fed to the conveyer belt and an endless belt disposed between the stationary platform and the conveyer belt and having a portion of its surface extending from the edge of the stationary platform to a line in close proximity to the adjacent edge of the conveyer belt so as to form with the surface of said platform a substantially continuous surface, the upper lap of said belt being arranged to move in a direction towards the conveyer belt to assist the transfer of the articles from the stationary platform to the conveyer belt, and means for returning to the feed table any article that may be on top of another article on the conveyer belt, said means including an arm disposed above the conveyer belt and arranged to oscillate transversely of the conveyer belt about an axis normal to the plane of the conveyer belt.

ALFRED GERMAN ROSE.